(12) United States Patent
Pankow (10) Patent No.: US 6,662,397 B2
(45) Date of Patent: *Dec. 16, 2003

(54) CONTACT LENS TREATMENT APPARATUS (75) Inventor: Mark L. Pankow, Chicago, IL (US)

(73) Assignee: IsoCLEAR, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/917,100

(22) Filed: Jul. 27, 2001

(65) Prior Publication Data

US 2002/0069896 A1 Jun. 13, 2002

Related U.S. Application Data (63) Continuation of application No. 09/493,636, filed on Jan. 28, 2000, now Pat. No. 6,280,530.

(51) Int. Cl.[7] .......................... G02C 13/00; B08B 11/00
(52) U.S. Cl. ............................... 15/104.92; 15/104.93; 15/214; 15/244.1; 206/5.1
(58) Field of Search .................... 134/6, 42; 15/104.92, 15/104.93, 214, 244.1; 206/5.1

(56) References Cited

U.S. PATENT DOCUMENTS 6,280,530 B1 * 8/2001 Pankow ........................ 134/42

* cited by examiner

Primary Examiner—Randy Gulakowski
Assistant Examiner—Saeed Chaudhry
(74) Attorney, Agent, or Firm—Cook, Alex, McFarron, Manzo, Cummings & Mehler, Ltd.

(57) ABSTRACT

A self-contained apparatus for cleaning contact lenses comprising a deformable, non-abrasive material having an enzyme enriched layer for contact with the optical surfaces of the lenses. While in contact with the optical surfaces, the contaminants on the lens surfaces are enzymatically removed. Upon separation of the lenses and the deformable material, substantially all of the enzymes are retained on the deformable material, largely eliminating the need to perform additional operations to inactivate the enzymes or otherwise rid the lenses of residual enzymatic matter.

4 Claims, 4 Drawing Sheets

CONTACT LENS TREATMENT APPARATUS

This is a continuation of application Ser. No. 09/493636 filed Jan. 28, 2000 now U.S. Pat. No. 6,280,530.

BACKGROUND OF THE INVENTION

The present invention is directed to an apparatus and method for treating contact lenses. More particularly, the invention is directed to a stand-alone apparatus and method by which contact lenses can be enzymatically cleaned without the need for abrasion or the need to perform the traditional steps of either inactivating the enzyme or thoroughly washing the residual enzyme from the lenses. In a particularly advantageous form, the apparatus is single-use and disposable, and comprises a housing including a pair of closable liquid sealed containers sized and shaped to accept and retain a lens therein such that the lens is brought into contiguous wetted contact with an enzyme enriched layer during the treatment process.

Contact lenses have come into wide use for correcting a wide range of vision deficiencies or cosmetic use. Typically, such lenses are formed from a thin transparent plastic material shaped and dimensioned to fit over the cornea of the eye. The lenses have an optical surface that includes a concave interior first optical surface for contact with the eye, an opposed and optically associated convex exterior second optical surface, and a surrounding edge. The two surfaces together define a lens that may be medically prescribed for a particular eye.

Depending on the polymer material used to construct the lenses, the lenses may be either "hard" or "soft". Hard contact lenses, which are comparatively more rigid, are typically formed from a relatively hydrophobic material such as polymethyl methacrylate (PMMA). Soft contact lenses, which are comparatively more pliant, are typically formed from a relatively hydrophilic polymer such as hydroxyethyl methacrylate (HEMA), which has the property of being able to absorb and bind a proportionately large amount of water within the polymer network. Soft contact lenses formed from such hydrophilic polymers, when hydrated, are more comfortable to wear than hard lenses because they better conform to the cornea of the eye and cause less irritation when worn for extended periods. For this reason, the great majority of contact lenses presently being prescribed are of the soft type.

Unfortunately, all contact lenses, and, in particular, soft lenses, while being worn collect contaminants from the eye and its environment. These contaminants, for example, may include proteins and lipids from the tear fluid of the eye, and foreign substances such as cosmetics, soaps, airborne chemicals, dust and other particulate matter. Unless periodically removed, these contaminants may cause abrasion to the surface of the eye, may impair the visual acuity of the lens, and may serve as a nutrient media for potentially harmful microorganisms.

Furthermore, with regard to soft contact lenses for wearing comfort it is necessary that they be maintained uniformly wetted at all times. While on the eye, the moisture content of the hydrophilic material of the lenses is maintained by tear fluid. However, when the lenses are removed for an extended period, as for cleaning or while sleeping, the lenses may dry out and become irreversibly damaged unless they are externally hydrated.

Consequently, various apparatus and methods have been developed for cleaning and hydrating contact lenses. For example, cleaning apparatus has been provided wherein the lenses are submersed in a variety of liquid cleaning agents, such as surfactants, oxidants, disinfectants, enzymatic cleaners, or abrasives. Other cleaning apparatus has been provided which included mechanically operated or electrically powered components for vibrating, rotating, abrading, scrubbing, heating, agitating, subjecting to ultrasonic energy, or otherwise mechanically manipulating the lenses to enhance the cleaning action of the cleaning agent.

Such prior apparatus and methods have not been entirely satisfactory for various reasons, including lack of cleaning effectiveness with respect to certain of the various contaminants found on the lenses, undesirable complexity, excessive time required for use, harshness to the lens material and dependence on an external power source.

Furthermore, certain prior lens cleaning apparatus and methods required added post-cleaning lens treatment procedures such as thorough rinsing before the lenses could be returned to the eye. For example, an important concern relating to the enzymatic cleaning systems currently being employed is the need to remove the enzymatic matter prior to placing the cleaned lens in the eye. Placing a lens contaminated with enzymatic matter into the eye may be potentially detrimental to the eye. Accordingly, users of enzymatic cleaners have been advised to thoroughly rinse the contact lens free of cleaning enzyme prior to placing the cleaned lens in the eye. This rinsing step, however, requires user compliance to be effective. Users may consider such rinsing unnecessary. Users also may not, and/or may not be able to, rinse the lens thoroughly enough to remove all residual enzymatic matter. As a result, active enzyme can come into contact with the eye. Additionally, in some instances, even thoroughly rinsing the lenses may not be totally effective in removing residual enzymatic matter bound to the lens.

U.S. Pat. No. 5,783,532 recognizes the problem of residual enzymatic matter on the lens and discloses an enzymatic cleaning composition containing a component which is asserted to be effective when released to deactivate the enzyme. This system, however, even if effective, still relies on the user to complete the steps necessary to deactivate the enzyme and to wait for complete inactivation to occur before placing the cleaned lens in the eye. Thus, in such a system, the problems associated with residual enzymatically active matter on the lens still exist if the lens is removed from the cleaning composition prior to complete inactivation. Additionally, even if inactivated, inactive enzymatic protein may still adhere to the lens and may cause an associated allergic reaction.

Therefore, a demand exists for an apparatus and method by which contaminated contact lenses can be conveniently and effectively enzymatically cleaned with minimum residual enzymatic matter remaining on the lens.

Accordingly, it is a general object of the present invention to provide a new and improved system, apparatus and method for cleaning contaminated contact lenses.

It is a more specific object of the invention to provide an apparatus for cleaning contaminated contact lenses wherein the lenses are enzymatically cleaned.

It is a further object of the present invention to provide a disposable single-use apparatus for enzymatically cleaning contaminated contact lenses having closable liquid-sealed container within which the lenses are contained while being cleaned.

It is a further object of the invention to provide a self contained apparatus for enzymatically cleaning a contaminated contact lenses wherein the optical surfaces of the lenses may be received in a wetted environment in contiguous contact with an enzyme enriched layer whereby contaminants from the lenses can be removed without the application of external force.

It is a further object of the invention to provide an apparatus and method of enzymatically cleaning contaminated contact lenses wherein the lenses can be removed from the cleaning environment at any time and placed in the eye with generally less risk of residual enzymatic matter remaining on the lens relative to that potentially present from conventional enzymatic treatment processes.

SUMMARY OF THE INVENTION

The invention is directed to an apparatus for cleaning a contact lens of the type having a pair of opposed optical (or lens) surfaces and contaminated with contaminant matter, comprising a solid phase having enzymatic matter bound to the surface thereof defining a first non-abrasive reactive surface operative when in contact with a first optical surface of the lens to reduce contaminant matter on the lens, the reactive surface being getable and shaped for generally contiguous engagement between the optical surface and the reactive surface whereby enzymatic matter bound to the layer contacts contaminants on the lens.

The invention is further directed to a method for cleaning a contact lens of the type having two optical surfaces and contaminated with contaminant material, comprising the steps of:

positioning at least one of the optical surfaces of the lens in contiguous engagement with a solid phase having a surface enriched with enzymatic matter selected to act on contaminants on the lens;

maintaining the surfaces in contiguous wetted contact; and removing the lens from the support surface for use.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

The present invention is applicable for cleaning all types of materials susceptible to enzymatic cleaning. The present invention is particularly applicable to cleaning all types of lenses and especially contact lenses. Such lenses, for example, conventional hard contact lenses and soft contact lenses, may be of any material or combination of materials and may have any suitable configuration. Thus, while the preferred embodiment is described with particular reference to contact lens, those of ordinary skill in the art will appreciate that the present invention can be applied to other types of materials and lenses.

The present invention is directed to new apparatus and methods of enzymatically cleaning lenses using a solid phase and/or a support material having an enzymatically active surface which when positioned against the lens allows the enzymatically active matter to break down organic matter such as protein, mucin and/or lipid materials depending on the enzyme or enzymes used. The solid phase and/or support material is preferably porous to facilitate diffusion of the cleaved contaminants away from the lens. Cleaning organic materials, such as protein, mucin and/or lipids materials from the lens can also serve to cleanse the lens of inert contaminants since such inert contaminants are often attached to or trapped in the organic materials and carried away when those organic materials are cleaned from the lens. A preferred embodiment includes enzymatically active matter in which the enzymatic matter has at least one end or site bound to the surface of the solid phase and has a free end or site which is active to act on contaminants on the lens. As described in further detail hereinafter, the solid phase or support material can be of single layer or of multilayer construction.

Preferably the bond between the enzyme and the solid phase is sufficient to prevent significant loss of enzymatically active matter from the solid phase when the enzymatically active solid phase is placed in contact with the lens. More preferably, the bond between the enzymatically active matter and the solid phase is stronger than the attraction between the free end of the enzymatically active matter and the lens material to reduce the incidence of the enzymatic matter binding to the lens material over the solid phase when the lens is separated from the enzymatically active solid phase. Thus, the amount of residual enzymatic matter on the lens after cleaning, if present at all, is diminished relative to the amount which remains on the lens that have undergone treatment by conventional enzymatic methods and there is a concomitant diminishment in the risk of a sensitivity reaction to the lens if it is worn with or without the further conventional cleaning step of rinsing residual enzymatic matter from the lens.

Any suitable solid phase material can be used as a base for the enzymatic matter, including natural and synthetic polymers and mixtures thereof, e.g. polyethylene, polypropylene, acrylic, nylon, and cellulose based materials as well as other materials demonstrating plasticity. The solid phase material preferably should have a non-abrasive surface and should remain largely non-abrasive with the enzymatic matter bound to its surface to prevent scratching of the lens when the solid phase material is positioned against the lens surface. The solid phase material may be selected to promote deactivation of the enzymatic matter after use to prevent reuse if such reuse presents a safety concern. For example, a hydrophobic material can be used as the solid phase. Such a material can be dried or may readily become dried after use and thereby deactivate enzymatic matter requiring a liquid interface for effective action. It has been suggested that the immobilization of proteolytic enzymes should reduce the ability of the enzyme to cause its own inactivation through autodigestion by isolating enzyme molecules and thereby preventing them from mutual attack. *Handbook of Enzyme Biotechnology*, Chapter 5 (A. Wiseman editor, $3^{rd}$ ed, 1995).

It will be appreciated by those skilled in the art, that there are several methods for attaching enzymatic matter to a carrier including physical adsorption, ionic binding, chelation or metal binding, and covalent binding. Id. It will further be appreciated that these methods encompass other methods. For example, covalent binding methods also include crosslinking based on the formation of covalent bonds between enzyme molecules. The covalent binding method is preferred because of the ability to produce stable immobilized-enzyme preparations which do not leach enzyme into solution.

Literature references are available disclosing methods for immobilization of various enzymes on various carriers, such as trypsin, papain and pepsin on cellulose by diazotization coupling, xanthine oxidase on cellulose by amide bond, and dextransucrase on filter paper by alkylation/arylation, to name a few. Id.; see also Helmut Uhlig, *Industrial Enzymes and Their Applications*, Chapter 4 (Elfriede M. Linsmaier-Bednar trans., John Wiley & Sons, Inc. 1998).

Literature references are also available disclosing methods for immobilization of other enzymes such as lipases preferably on more hydrophobic carriers than cellulose such as microporous polyethylene or polypropylene powders especially those with high internal surface areas of 100 sq.m/g and pore sizes of 0.2–0.5 micrometers. Id. For example, it is reported that an aqueous buffer solution of Candida lipase (Enzeco [EDC]; Maxazyme LP [GB}; or Type VII Lipase [SCC]) was stirred with ethanol-prewetted Accurel powder (manufactured by AKZO Fibers, Obernburg, Germany) and the immobilisate showed enzymatic activity of 98% (HDPE) and 107% (PP). Id.

Publications relating to the details of these methods are listed in the *Handbook of Enzyme Biotechnology*, Chapter 5, and in the *Industrial Enzymes and Their Applications*, Chapter 4, and the contents of these publications are incorporated herein by reference.

Other examples of suitable solid phase materials include getable materials such those used for chromatography. An example of such a material is a chromatography media having a composite structure of cellulose and acrylic crosslinked in a framework to create a porous fibrous matrix such as that sold by Cuno, Inc. under the brand name Zetaffinity. The solid phase material is preferably activated to bind enzymes to the surface of the support such as through the use of amino groups, silane groups or carboxylic acids. For example, the solid phase material, such as Zetaffinity, can include amino groups of various atomic lengths which can be activated such as by exposure to a material such glutaraldehyde, useful to cross link protein and polyhydroxy materials, to yield stable aldehyde groups. The aldehyde groups provide sites for binding an appropriate enzyme.

Numerous types of purified, semi-purified or crude preparations of enzymes can be used including pancreatin, trypsin, collagenase, keratinase, aminopeptidase, elastase, aspergillopeptidase, and lipase. The enzymes may be neutral, acidic or alkaline. However, it is preferred that the enzymes have substantial activity at pH between 5.0 and 10.0, and more preferably between 6.0 and 9.0.

Preferred enzymes are proteases selected from the group comprising serine proteases, acidic aspartic proteases, cysteine proteases and metallo proteases, respectively, as well as truncated, modified enzymes or variants thereof.

Examples of preferred serine proteases are e.g. trypsins, chymotrypsins and subtilisins.

Most preferred are the Bacillus derived alkaline serine proteases, such as subtilisin BPN', subtlisin Carlsberg, subtilism PB92, subtilisin 147, subtilisin 168, subtilism DY, aqualysin or thermitase, truncations, modification and variants thereof.

Examples of cysteine proteases are e.g. papain and bromelain. Examples of suitable metallo proteass are e.g. neutrase and collagenase. Examples of suitable acidic aspartic proteases are e.g. pepsin A, pepsin B, pepsin C, chymosin and cathespsin B.

Especially preferred enzymes are pancreatin, a multienzyme complex having proteolytic, lipolytic and amylolytic activity and papain, an enzyme having proteolytic activity. Pancreatin is a multienzyme complex derived from animal pancreata, preferably from porcine pancreata. Papain is an enzyme derived from the green fruit of *Carica papaya*. These enzymes are generally commercially available. Further details concerning pancreatin and papain are set forth in *The Merck Index*, $10^{th}$ Ed., pages 1005 and 1007 (1983), including a listing of publications relating to these enzymes; the contents of these publications are incorporated herein by reference.

Preferably, a soluble enzyme, such as one isolated from porcine pancrease, is used which can be readily bound to the solid phase material. For example, the enzyme can be applied to an aldehyde activated solid phase material, such as an activated Zetaffinity media and the enzyme becomes bound to the material though the aldehyde group. The amount of enzymatic matter capable of being bound to the material may be dependent on the material used and the size of the enzymatic matter. Preferably the density of the enzymatic matter bound to the solid phase surface is in the range of 100–500 ug of enzymatic matter per square centimeter of the solid phase surface. More preferably the range is between 150–500 ug of enzymatic matter per square centimeter of the solid phase surface.

If desired, chemical spacing groups can be used to increase the distance between the solid phase material and the enzyme. The spacer may be used to decrease steric hindrance effects and to add a degree of flexibility to the enzyme molecule. Various hydrocarbon lengths having, preferably terminal, reactive amines may be used. Thus, various amino acids or peptides having amine groups can be used as spacer molecules. The amine group can be coupled to an active material which is chemically active towards amine groups and then in turn the enzyme can be attached to the opposite end of the amine spacer molecule. Examples of useful spacers include diamino dipropylamine, ethylene diamine, hexane diamine, 6-amino caproic acid.

In the simplest form of the invention, the enzyme is attached directly to, or directly integrated with, a solid phase material that can conform to the shape of a contact lens such as a pliant solid phase material. Thus, while the treatment apparatus may take many forms it can be as simple as a single ply formed from or having active enzymatic matter. Preferably, the enzyme activated solid phase material is wetted to provide and/or enhance a reactive interface between the enzymatic matter and the lens contaminants when the two are placed in generally contiguous contact with each other. Additionally, especially for soft contact lenses, the enzyme activated solid phase material is preferably wetted to prevent the lenses from drying out during the cleaning process. Those skilled in the art will appreciate that in certain applications it may be desirable to limit the degree to which the material is wetted to the minimum level of moisture necessary to accomplish the foregoing objectives. For example, it may be desirable to limit the degree the material is wetted to promote deactivation of the enzymatic matter and to encourage disposal of the treatment apparatus after a single use.

Accordingly, the enzyme activated solid phase material is wetted or has earlier been wetted and the wetted solid phase material is placed in contact with the dirty lens. Preferably, the solid phase material is configured to contact both the inner and outer surfaces of the lens. Contact is maintained between the enzyme activated solid phase material and the lens for a desired period, in some cases one to two hours or longer. After cleaning, the lenses are preferably rinsed to wash away contaminants removed as a result of contact between the enzyme active solid phase and the lenses. From a sensitivity to enzymatic material standpoint, the lenses can, however, be worn with little or no rinsing since little, if any, enzymatic matter remains bound to the lens. Furthermore, some of those compositions that typically contaminate a lens may, after being drawn off the lens to the enzymatic cleaning, adsorptively adhere to the reactive layer and/or a secondary support for the reactive layer.

Because enzymatic cleaning is a time dependent reaction, the solid phase material selected should be able to maintain its contact with the lens for an extended period. Accordingly, as described in greater detail below with specific reference to the drawings, it may be preferable to apply the enzyme activated solid phase surface to another material which is pre-formed to, and/or able to, conform to the shape of, and maintain contact with, the lens.

Those of ordinary skill in the art will appreciate that the present invention can be embodied in a variety of forms. For example, the enzyme activated material may be pliant and a clip or another holding mechanism may be used to hold the enzyme activated material in contact with the lens. Preferably in such arrangement, the enzyme activated material is placed around the lens and the clip is placed around the material and is shaped to induce the material to conform to shape of the lens so that the enzyme activated material is in contiguous contact with the convex, concave lens surfaces. In the preferred arrangement, the enzyme activated material is packaged in a sterile manner and is discarded after use for safety purposes. Preferably, the clip is reusable.

The enzyme activated material can be packaged dry or with an opthalmologically compatible solution. If packaged dry the solution can be added prior to application. Preferred ophthalmologically-compatible solutions include those known ophthalmologically-compatible solutions such as sold by Bausch & Lomb, Alcon, Ciba-Geigy, and Allergan. The solutions may contain ophthalmologically-compatible anti-microbial agents or preservatives. Additionally, the solutions may include other additives such as surfactants, buffers, activators or other components to enhance enzymatic cleaning.

Figure 1:
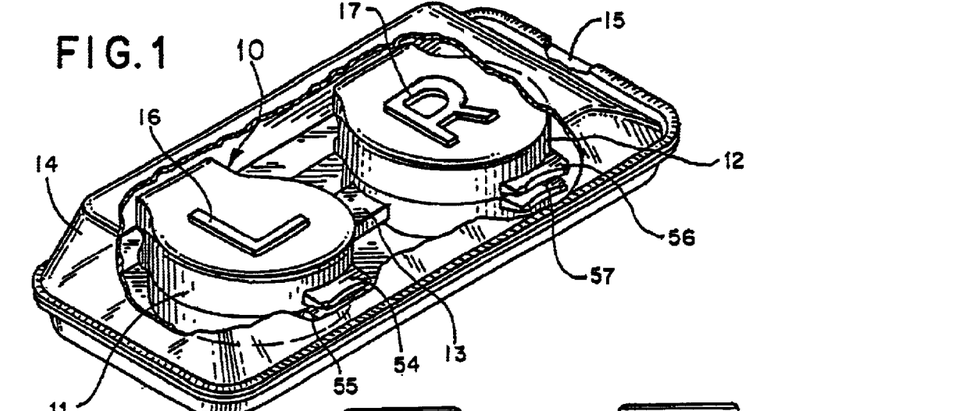
FIG. 1 is a perspective view of a contact lens treatment apparatus constructed in accordance with the invention contained within a sealed foil package.
Figure 2:
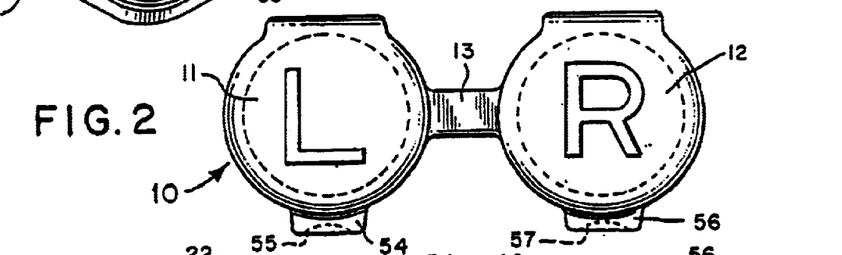
FIG. 2 is a top plan view of the contact lens treatment apparatus of FIG. 1 showing the left and right lens containers thereof.
Figure 3:
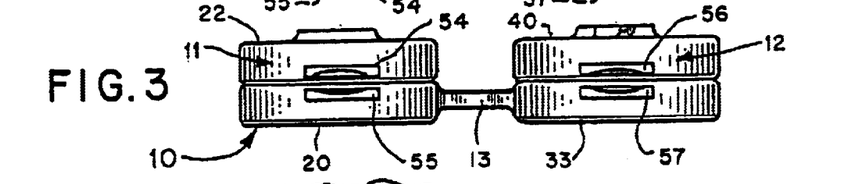
FIG. 3 is a side elevational view of the contact lens treatment apparatus of FIG. 2.

Referring to the Figures, and particularly to FIGS. 1–3, a lens treatment apparatus 10 having several common features to the apparatus described in U.S. Pat. No. 5,657,506 is shown. In accordance with the present invention apparatus 10 is constructed to include a single piece housing including a left lens container 11, a right lens container 12 and a bridge portion 13 extending between the two containers. The apparatus, which may be a disposable single-use apparatus, is preferably contained within a sealed package 14 formed of a foil or other liquid and gas impermeable material. A tab surface 15 or other means may be provided on the package to facilitate opening by a user. The apparatus 10 may include identification means such as a raised "L" 16 embossed on the cover of container 11 and a raised "R" 17 embossed on the top of container 12 to facilitate ready identification of the left and right lens containers by a user, even if vision-impaired.

Figure 4:
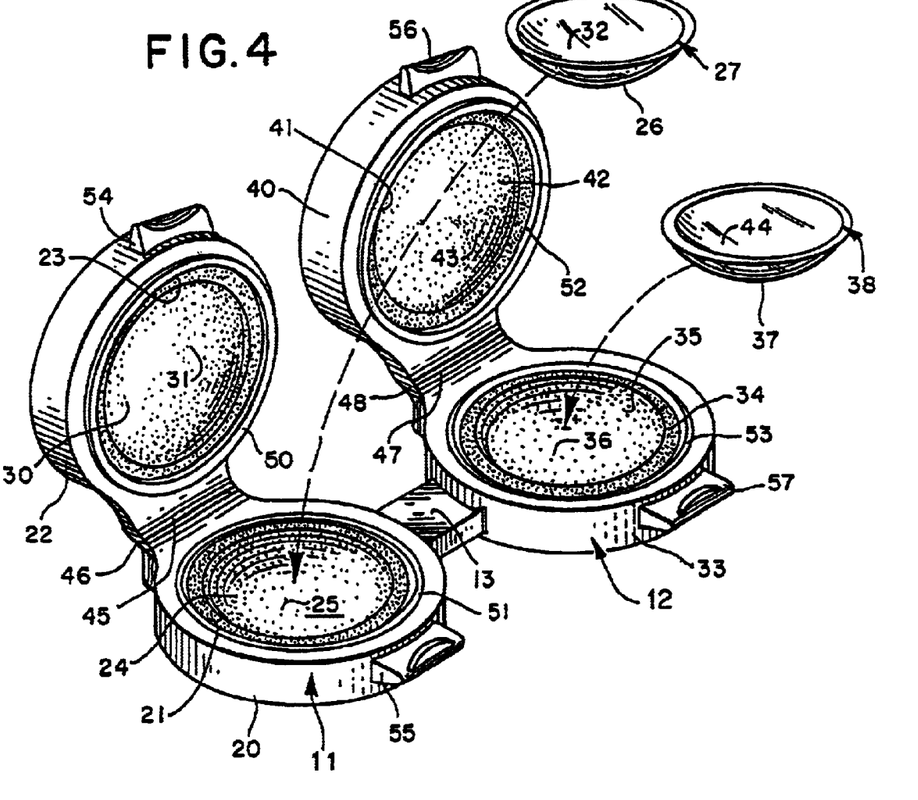
FIG. 4 is an enlarged perspective view of the contact lens treatment apparatus of FIGS. 1–3 showing the left and right lens containers thereof open for receiving a pair of conventional soft contact lenses for treatment.
Figure 5:
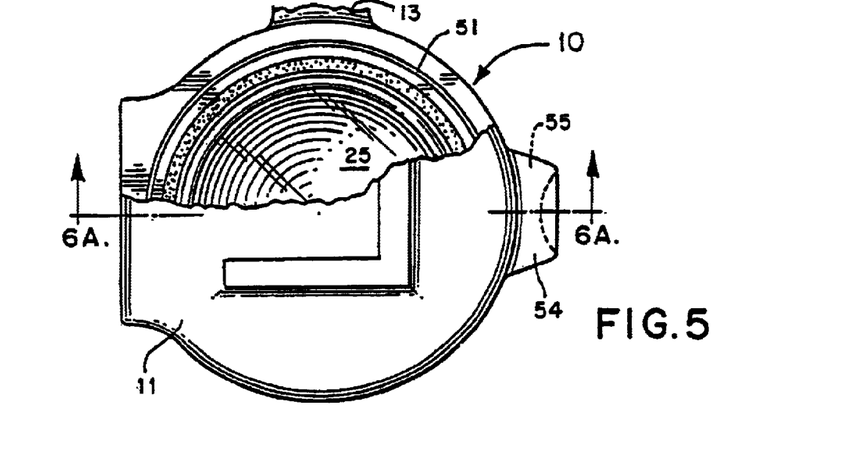
FIG. 5 is an enlarged plan view of the left contact lens container of FIG. 4.
Figure 6A:
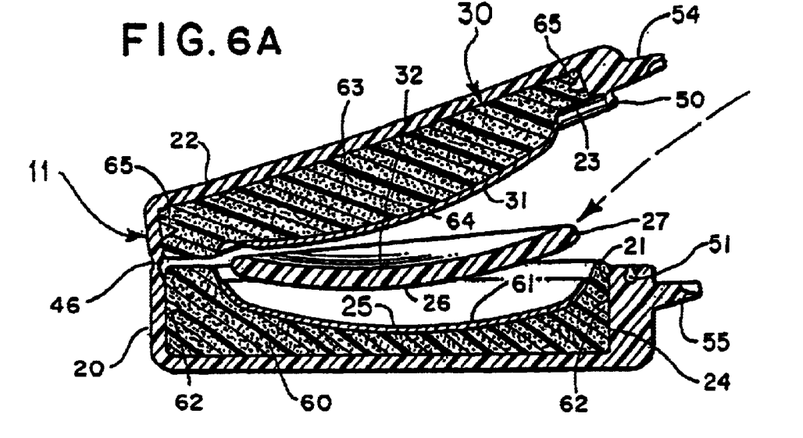
FIG. 6A is an enlarged cross-sectional view of the left lens container taken along line 6—6 of FIG. 5 showing the lens container open for receiving a conventional soft contact lens for treatment.
Figure 6B:
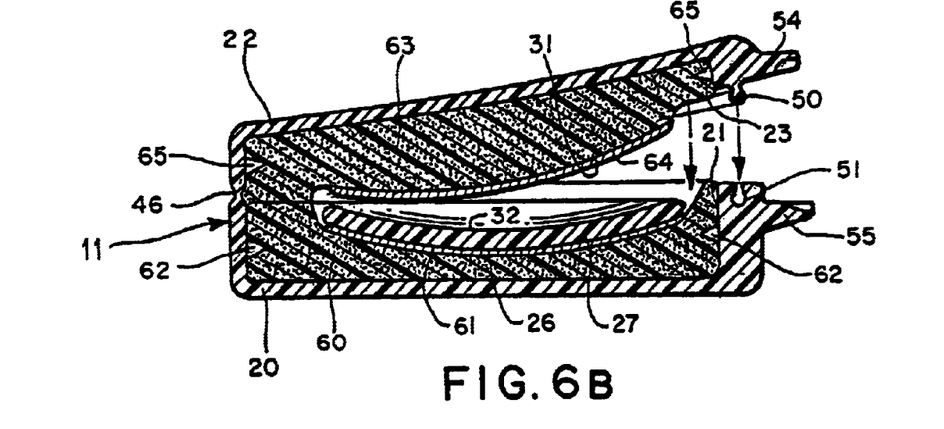
FIG. 6B is a cross-sectional view similar to FIG. 6A showing the lens seated in the container.
Figure 6C:
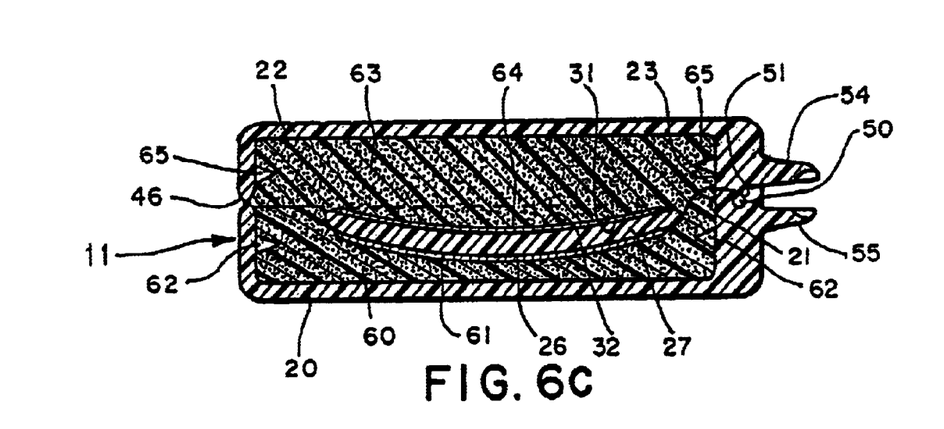
FIG. 6C is a cross-sectional view similar to FIGS. 6A and 6B showing the lens container closed with the lens positioned within for treatment.

As shown in FIGS. 4 and 6, the left lens container 11 includes a bottom section 20 defining a recess 21, and a top section 22 defining a recess 23. An insert 24 having a generally concave surface 25 is provided in the housing bottom portion 20 for engaging the convex optical surface 26 of a conventional soft left contact lens 27. An insert 30 having a generally convex surface 31 is provided in recess 23 for engaging the convex optical surface 32 of lens 27 when the housing is closed.

Similarly, the bottom section 33 of right lens container 12 defines a recess 34 in which an insert 35 having a generally concave surface 36 for receiving the convex optical surface 37 of a conventional soft right contact lens 38. The top section 40 of the right lens container defines a recess 41 in which an insert 42 having a generally convex surface 43 for engaging the concave optical surface 44 of lens 38.

The lower section 20 of the left lens container 11 is connected to the upper housing section 22 by a hinge portion 45 which includes a lateral portion 46 of reduced thickness (FIGS. 6A–6C) forming a living hinge along which the sections open as shown in FIG. 4. Similarly, the bottom right container section 33 is joined to the top right container section 40 by a hinge portion 47 having a living hinge portion 48.

A bulbous ridge 50 extending around the periphery of the top section 22 of the left lens container 11 engages a complementary shaped and positioned channel 51 extending around the periphery of the bottom section 20 of the container to provide a liquid seal for containing liquid within the container. A similar ridge 52 and channel 53 liquid-seal the right lens container 12. A pair of tabs 54 and 55 are integrally formed on the top and bottom sections, respectively, of the left lens container 11 to facilitate opening and closing the container. Similarly, a pair of tabs 56 and 57 are integrally formed on the top and bottom sections, respectively, of the right lens container 12 to facilitate opening and closing that container.

The housing and integral lens containers are preferably formed of an inert semi-resilient plastic or other formable material such as by injection molding or other suitable manufacturing technique. Preferably, for minimum cost the containers and the connecting bridge member are formed as a single piece in a single forming operation. The plastic may be colored for optimum visibility or to indicate some particular characteristic of a particular assembly.

Referring to FIGS. 6A–6C, insert 24 is seen to comprise a relatively thick porous and compressible sponge-like layer 60 dimensioned to fit snugly within recess 21 and formed with a generally concave surface over which a thin reactive layer 61 of a solid phase material having surface active enzymatic matter is provided to form the concave lens engaging surface 25. A plurality of spike-like tines 62 may be provided on the inside surface of recess 21 to assist in holding insert 24 in the recess. Similarly, insert 30 comprises a resilient porous sponge-like layer 63 dimensioned to fit snugly within recess 23 and shaped with a generally convex surface over which a thin reactive layer 64 of solid phase material having surface active enzymatic matter such as that forming layer 61 is provided to form lens engaging surface 31. A plurality of spike-like tines 65 may be provided on the surface of recess 23 to assist in holding insert 30 in the recess.

As shown in FIG. 6C, when the left lens container 11 is closed reactive surface 25 is brought into contiguous engagement with optical reactive surface 26 and reactive surface 31 is brought into contiguous engagement with optical surface 32. The compressible sponge-like layers 60 and 63 are preferably dimensioned slightly oversize in their respective recesses, so that as the top and bottom sections of the lens container come together the layers are slightly compressed to provide a conforming contiguous contact between the optical surfaces 26 and 32 of the lens and the respective contacting surfaces 25 and 31 of the inserts.

During the manufacture of lens treatment apparatus 10 compressible layers 60 and 63 within the left lens housing 11 are preferably moistened with an ophthalmologically-compatible solution. When contact lens 27 is inserted in the housing for cleaning (as shown in FIG. 6A), and the container is subsequently closed by the user (as shown in FIGS. 6B and 6C), the accompanying compression of layers 60 and 63 causes solution absorbed therein to flow around the ends of reactive layers 61 and 64 (FIG. 6C) and around, over and under lens 27, providing a fluid layer between the optical surfaces 26 and 32 of the lens and the contiguous contacting surfaces 25 and 31 of reactive layers 61 and 64, respectively.

In accordance with the invention, reactive layers 61 and 64 may be formed from a solid phase material such as Zetaffinity-brand crosslinked cellulose and acrylic copolymer chromatographic media having enzymes, such as pancreatin enzymes bound to amino activated sites, on the surface of the solid phase. The enzymes are selected to act on the proteolytic, lipid and/or mucin contaminants on the surface of lens 27. Consequently, when the optical surfaces of the lens are brought into wetted contiguous contact with the surface of these layers, lipids and other protein contaminants attached to the lens are enzymatically removed from the surface of the lens and the enzyme matter remains on the surfaces of the reactive layers when the lens is removed. This occurs on both the concave and convex optical surfaces of the lens.

For optimum enzymatic cleaning the reactive layer must conform faithfully to the surface of the lens. To this end, reactive layers 61 and 64 are preferably thin and flexible, and deformable by their associated sponge-like compressible layers 60 and 63 to the optical surfaces of the lens. The reactive layers 61 and 64 may be adhered or joined to their associated sponge-like layers by known techniques. The solid phase material comprising the reactive layers 61 and 64 spraying of the solid phase material over the relatively more porous surface of the underlying compressible layer may be applied to the compressible layers such as by adhesion or before reactive layers 61 and 64 are activated with the enzymatic matter.

The right lens container 12, which is preferably identical in construction to the left lens container 11, includes inserts 35 and 42 formed of the same materials and having the same dimensions as inserts 24 and 30 of the left lens container 11.

It is preferable that lens housings 11 and 12 each have sufficient interior volume to enable an adequate volume of ophthalmologically-compatible solution to be absorbed in the compressible layers of each to maintain the lenses wetted during cleaning. Leakage and evaporation of the ophthalmologically-compatible solution from the lens containers is prevented prior to, during and after treatment of the lenses by ridge 50 and channel 51 in container 11, and identical structures in container 12, which extend around the entire periphery of the containers. When the containers are closed as shown in FIG. 6C, the ridges fit into the channel, forming both tight mechanical and tight fluid seals. These seals, and the seal provided by foil package 14 generally prevent evaporation of the ophthalmologically-compatible solution during even long term storage.

The compressible layers 60 and 63 are preferably formed from a highly porous absorbent material which accepts and retains moisture within its porous structure, and has an appreciable moisture content and therefore does not generally require re-wetting prior to use. Inert foraminous materials such as reticulated foams and papers are preferred materials for this purpose.

A pair of lenses may be advantageously treated using the apparatus of the present invention as follows. First, the treatment apparatus 10 is removed from its wrapper 14 and the lens containers 11 and 12 are opened. Then, the lenses are removed and positioned on the pre-wetted reactive surfaces 25 and 36 of the two lens containers. The two lens containers are then closed, causing the optical surfaces of the lenses to be brought into contiguous wetted contact with the reactive surfaces of the apparatus. The lenses are allowed to remain in the closed containers for a period of time proportional to the degree to which the lenses are contaminated and/or the length of time since the lenses were last cleaned. Generally, a significant amount of contaminants are expected to be dislodged from contaminated-coated lenses that remain in the housing for a period of 2 hours. Heavily contaminated lenses may require a longer period of time, such as overnight when the wearer is sleeping.

After the treatment has been accomplished, the lenses are removed from the containers and returned to the user's eyes. The lens may be worn generally without rinsing. Optionally, the lenses are rinsed prior to being worn to ensure that any dislodged contaminants are washed away. The lens containers are closed, and the treatment apparatus, now containing the contaminants within its sealed containers, may be appropriately disposed.

While embodiments of the apparatus discussed above include a reactive material layered over compressible material, an additional embodiment of the invention may provide wetted reactive material formed in a lens receiving shape without a housing or compressible layer to accommodate a lens on and/or between the material. The reactive material may itself close around the lens, or the reactive material may be held against the lens within the apparatus package or by external closure means.

Figure 7:
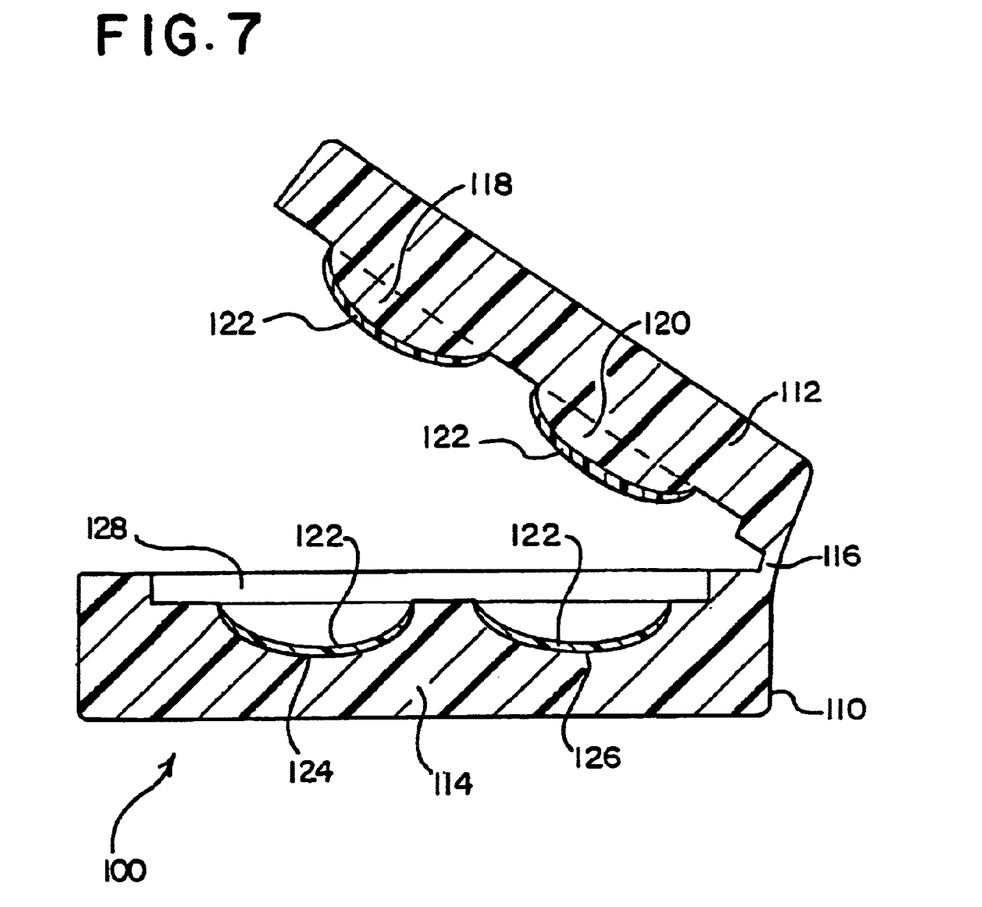
FIG. 7 is a cross-sectional view of an alternate embodiment of a lens cleaning apparatus in accordance with the present invention.

Referring to FIG. 7, another embodiment of a lens treatment apparatus 100 in accordance with the invention is seen to include a container 110 having an upper body section 112 and a lower body section 114 joined together by hinged portion or fold line 116. The interior of the upper body section 112 includes convex surface portions 118 and 120. A layer of material having enzymatic matter on its external surface 122 covers convex portions 118 and 120. The interior of lower body section 114 includes concave surface portions 124 and 126. A layer of material having enzymatic matter on its external surface 122 covers concave portions 124 and 126.

Convex portions 118 and 120 and concave portions 124 and 126 are dimensioned and positioned to cooperatively engage contact lenses (not shown) placed in the container 110 when the container is closed. Preferably, the interior of lower body section 114 includes a recessed portion 128 surrounding the concave portions 124 and 126 for holding an opthalmological compatible solution which solution can be prepackaged with the apparatus or placed in the apparatus prior to use. When contact lenses are placed in the apparatus for cleaning and the apparatus is closed, solution flows around the reactive layers 122 providing a fluid communication interface between the optical surface of the lens and the contacting surfaces of reactive layers 122, respectively.

The container body 110 can be constructed from any suitable material and can be constructed for single use or repeated use applications. For example container body 110 can be constructed from polymeric materials, including synthetic polymers such as polyethylene, polypropylene, polyvinyl chloride, polyethylene terephthalate and other similar materials and can include common additives including, but not limited to, fillers, pigments and plasticizers. Container body 110 can also be constructed from natural materials such as cellulose. For example, a preferred material for container body 110 is a fibrous cellulose which is compliant and absorbent.

When using an absorbent material such as fibrous cellulose for container body 110 it may be desirable to treat or coat the exterior of container body 110 to provide the container with a moisture impermeable barrier to prevent leakage of the solution from the container. For example, a wax can be applied to the exterior of an absorbent container body such as a cellulose container body to provide a moisture barrier. Alternatively, a plastic coating or metal foil can be applied to the exterior of such a container body to provide a moisture barrier. Alternatively, container body 110 can be constructed from a moisture impermeable shell such as a shell made from a synthetic polymer and an absorbent cellulose insert dimensioned to fit within such shell.

Convex portions 118 and 120 and concave portions 124 and 126 can be formed directly in container body 110 or can be in the form of inserts for container body 110. The reactive layers 122 also can be supplied in a variety of ways. For example, convex portions 118 and 120 and concave portions 124 and 126 can be made from an absorbent cellulose material and reactive layer 122 can be provided by directly binding enzymatic matter to the surface of such portions, 118, 120, 124 and 126.

Alternatively, reactive layer 122 can take the form of a solid phase having enzymatic matter bound to it such as a cellulose paper which is coated with enzymatic matter. The cellulose paper can be in sheet form which is pre-applied to the external surfaces of the interior of container body 110 or in sheet form which is supplied separately for insertion into container body 110. It will be appreciated that such sheet form can be provided in different sizes and configurations to enable ease of use and accommodate economy concerns.

For example, reactive layer sheets 122 can be sized to fit within the container body 110 and entirely coated with enzymatic matter to guard against misalignment of the sheets when inserted into the container body relative to the location of convex and concave portions 118, 120, 124, and 126. Alternatively, the sheets can be sized to fit within the container body and the coating of enzymatic matter can be limited to those areas of the sheet designed to align with convex and concave portions 118, 120, 124, and 126. Alternatively, reactive layer 122 can be a solid phase having bound enzymatic matter, such as an enzyme coated cellulose paper, in "button" form which is sized and dimensioned for direct placement on convex and concave portions 118, 120, 124, and 126.

An additional embodiment of the apparatus may provide a reactive layer and wetted compressible layer without a housing, having an external closure means around the compressible layer to maintain the reactive layer engaged to the lens. The package material may be formed, for example, of polymeric and/or paper with or without foil for protection, sealing and/or enhancing the identification of the apparatus. Alternate constructions are also disclosed in copending Ser. No. 09/277,315, filed Mar. 26, 1999, the disclosure of which is incorporated by reference herein.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. An apparatus for enzymatically cleaning a contact lens having a lens surface and contaminated with contaminant material, comprising:

a solid phase material having a non-abrasive surface for engaging said lens surface;

said non-abrasive surface further having enzymatic matter supported thereon;

an opthalmologically compatible liquid for wetting said enzymatic matter;

a container for maintaining said enzymatic matter in contiguous wetted engagement with the lens surface.

2. A lens cleaning apparatus as defined in claim 1 wherein said enzymatic matter is selected from the group consisting of proteolytic enzymes, lipases and mixtures thereof.

3. A lens cleaning apparatus as defined in claim 1 wherein said enzymatic matter comprises pancreatin.

4. A lens cleaning apparatus as defined in claim 1 wherein said solid phase material is selected from the group consisting of polyethylene, polyethylene, acrylic, nylon, celluose polymers and copolymers, and mixtures thereof.

* * * * *